United States Patent
Ichihashi et al.

(10) Patent No.: US 8,916,291 B2
(45) Date of Patent: Dec. 23, 2014

(54) ELECTROLYTIC SOLUTION AND BATTERY (75) Inventors: Akira Ichihashi, Fukushima (JP);
Gentaro Kano, Fukushima (JP); Karin Tsuda, Fukushima (JP); Fumiko Kimura, Fukushima (JP)

(73) Assignee: Sony Corporation, Tokyo (JP)

( * ) Notice: Subject to any disclaimer, the term of this patent is extended or adjusted under 35 U.S.C. 154(b) by 1506 days.

(21) Appl. No.: 11/815,392

(22) PCT Filed: Feb. 14, 2006

(86) PCT No.: PCT/JP2006/302490
§ 371 (c)(1),
(2), (4) Date: Aug. 2, 2007

(87) PCT Pub. No.: WO2006/088002
PCT Pub. Date: Aug. 24, 2006

(65) Prior Publication Data
US 2009/0053599 A1  Feb. 26, 2009

(30) Foreign Application Priority Data

Feb. 18, 2005  (JP) .................................. 2005-041894
May 30, 2005  (JP) .................................. 2005-157100

(51) Int. Cl.
*H01M 6/04* (2006.01)
*H01M 10/0525* (2010.01)
*H01M 10/0568* (2010.01)
*H01M 10/0567* (2010.01)
*H01M 10/42* (2006.01)
*H01M 10/0587* (2010.01)
*H01M 4/139* (2010.01)

(52) U.S. Cl.
CPC ...... *H01M 10/4235* (2013.01); *H01M 10/0525* (2013.01); *Y02E 60/122* (2013.01); *H01M 10/0587* (2013.01); *H01M 4/139* (2013.01); *H01M 2300/0085* (2013.01); *H01M 10/0568* (2013.01); *H01M 10/0567* (2013.01)
USPC ....................................................... 429/199

(58) Field of Classification Search
USPC .......................................................... 429/314
See application file for complete search history.

(56) References Cited

U.S. PATENT DOCUMENTS 4,789,610 A * 12/1988 Kondo et al. .................. 429/321
2004/0191635 A1* 9/2004 Otsuki et al. .................. 429/326
(Continued)

FOREIGN PATENT DOCUMENTS

JP    07-312227     11/1995
JP    09213348   *  8/1997  .............. H01M 6/16
(Continued)

OTHER PUBLICATIONS

Katayama et al., Non-aqueous electrolyte seconday battery, and electric vehicle, hybrid vehicle and power storage system using same, Apr. 6, 2001,JP2001-093572 Japanese to English Machine Translation.*

(Continued)

*Primary Examiner* — Patrick Ryan
*Assistant Examiner* — Jose Colucci Rios
(74) *Attorney, Agent, or Firm* — Dentons US LLP (57) ABSTRACT

An electrolytic solution capable of suppressing the battery swollenness and improving the battery characteristics such as the charge and discharge efficiency and a battery using it are provided. A cathode (21) and an anode (22) are layered with an electrolyte layer (24) in between. The electrolyte layer (24) is gelatinous, containing the electrolytic solution and a polymer compound. The electrolytic solution contains a compound having proton scavenging capacity such as hexamethylenetetramine and hexaethylenetetramine. Thereby, a free acid such as hydrofluoric acid is scavenged, and decomposition reaction of the electrolytic solution or the like is prevented.

8 Claims, 5 Drawing Sheets

(56) References Cited

U.S. PATENT DOCUMENTS

2005/0202311 A1* 9/2005 Higashino et al. .............. 429/99
2005/0255385 A1* 11/2005 Harrup et al. ................. 429/328

FOREIGN PATENT DOCUMENTS

| | | | | |
|---|---|---|---|---|
| JP | 9-296274 | 11/1997 | | |
| JP | 9-2962889 | 11/1997 | | |
| JP | 10-177814 | 6/1998 | | |
| JP | 2000-067915 | * | 3/2000 | ............ H01M 10/40 |
| JP | 2000-67915 | 3/2000 | | |
| JP | 2001-022519 | 3/2001 | | |
| JP | 2001-93572 | 4/2001 | | |
| JP | 2001-093572 | * | 4/2001 | ............ H01M 10/40 |
| JP | 2001-266940 | 9/2001 | | |
| JP | 2004-22174 | 1/2004 | | |
| JP | 2004-241339 | 8/2004 | | |
| JP | 2005-71678 | 3/2005 | | |
| JP | 2005-228565 | 8/2005 | | |
| JP | 2005-235734 | 9/2005 | | |

OTHER PUBLICATIONS

International Search Report dated May 16, 2006.
Nobuhito Yoshihara, et al., Development of Double Nozzle Type Powder Jet Deposition Device, Tohoku University.
Nobuhito Yoshihara, et al., KEK Mechanical Engineering Workshop, Tohoku University.

* cited by examiner

ELECTROLYTIC SOLUTION AND BATTERY

TECHNICAL FIELD

The present invention relates to an electrolytic solution and a battery using it.

BACKGROUND ART

In recent years, downsizing and weight saving of portable electronic devices typified by a mobile phone, a PDA (personal digital assistant), and a notebook personal computer have been actively promoted. As part thereof, the energy density of batteries, in particular the secondary batteries as the driving power source thereof has been strongly aspired. As a secondary battery capable of providing the high energy density, for example, lithium ion secondary batteries using a material capable of inserting and extracting lithium (Li) such as a carbon material for the anode are known.

Further, in recent years, as a secondary battery capable of providing the high energy density, a secondary battery in which a material capable of inserting and extracting lithium is used for the anode, a lithium metal is precipitated on the surface, and thereby the capacity of the anode includes the capacity component due to insertion and extraction of lithium and the capacity component due to precipitation and dissolution of lithium has been developed (for example, refer to Patent document 1).

In these secondary batteries, for example, a secondary battery in which a complex oxide containing lithium, cobalt (Co), manganese (Mn) or the like is used for the cathode, and a solvent such as ethylene carbonate and an electrolyte salt such as lithium phosphate hexafluoride are used for the electrolytic solution has been practically used.

Patent document 1: International Publication No. 01/22519
Patent document 2: Japanese Unexamined Patent Application Publication No. 7-31227
Patent document 3: Japanese Unexamined Patent Application Publication No. 10-177814

DISCLOSURE OF THE INVENTION

However, there has been a problem that when lithium phosphate hexafluoride or the like is decomposed to generate a free acid such as hydrofluoric acid (HF), cobalt or manganese is eluted from the cathode and the electrolytic solution is decomposed, and thus the battery characteristics such as the charge and discharge efficiency are lowered.

In such a secondary battery, it has been considered that in order to improve the cycle characteristics, for example, a cyclic ester carbonate or the like in which some hydrogen is substituted with fluorine is used as a solvent (for example, refer to Patent Documents 2 and 3). However, when moisture is contained inside the battery, for example, in the case that 4-fluoro-1,3-dioxolan-2-one as one of such a cyclic ester carbonate is used, a hydrofluoric acid generated by hydrolysis promotes decomposition reaction of the electrolytic solution. Further, it is thought that the oxidation resistance of the product generated by the hydrolysis is low. Therefore, there has been a problem that, for example, when a laminated film is used as a package member, the battery that has been stored being charged at the high temperature environment is swollen.

In view of the foregoing problem, it is an object of the invention to provide an electrolytic solution capable of suppressing swollenness of the battery and improving battery characteristics such as charge and discharge efficiency, and a battery using the electrolytic solution.

A first electrolytic solution according to the invention contains 4-fluoro-1,3-dioxolan-2-one and a compound having proton scavenging capacity.

A second electrolytic solution according to the invention contains hexaethylenetetramine.

A first battery according to the invention includes a cathode, an anode, and an electrolytic solution, wherein the electrolytic solution contains 4-fluoro-1,3-dioxolan-2-one and a compound having proton scavenging capacity.

A second battery of the invention includes a cathode, an anode, and an electrolytic solution, wherein the electrolytic solution contains hexaethylenetetramine.

The first electrolytic solution of the invention contains 4-fluoro-1,3-dioxolan-2-one and a compound having proton scavenging capacity. Therefore, a free acid can be effectively scavenged by the compound having proton scavenging capacity. In the result, according to the first battery of the invention using the electrolytic solution, decomposition reaction of the electrolytic solution or the like can be prevented. For example, swollenness of the battery can be suppressed.

Further, when a nitrogen compound having an unshared electron pair is contained as the compound having proton scavenging capacity, higher effect can be obtained.

Further, when a concentration of the nitrogen compound in the electrolytic solution satisfies Mathematical formula 1, still further effects can be obtained.

Concentration of 4-fluoro-1,3-dioxolan-2-one (mol/kg)/number of unshared electron pairs in nitrogen compound×0.4≤concentration of nitrogen compound (mol/kg)≤concentration of 4-fluoro-1,3-dioxolan-2-one (mol/kg)/number of unshared electron pairs in nitrogen compound×1 [Mathematical formula 1]

Further, the second electrolytic solution of the invention contains hexaethylenetetramine. Therefore, while a free acid is effectively scavenged, the reactivity thereof can be lowered. In the result, according to the battery of the invention using the electrolytic solution, decomposition reaction of the electrolytic solution or the like can be prevented, and the battery characteristics such as the charge and discharge efficiency can be improved.

In particular, when a content of hexaethylenetetramine in the electrolytic solution is in a range from 0.001 wt % to 5 wt %, higher effects can be obtained.

BEST MODE FOR CARRYING OUT THE INVENTION

An embodiment of the invention will be hereinafter described in detail with reference to the drawings.

First Embodiment

Figure 1:
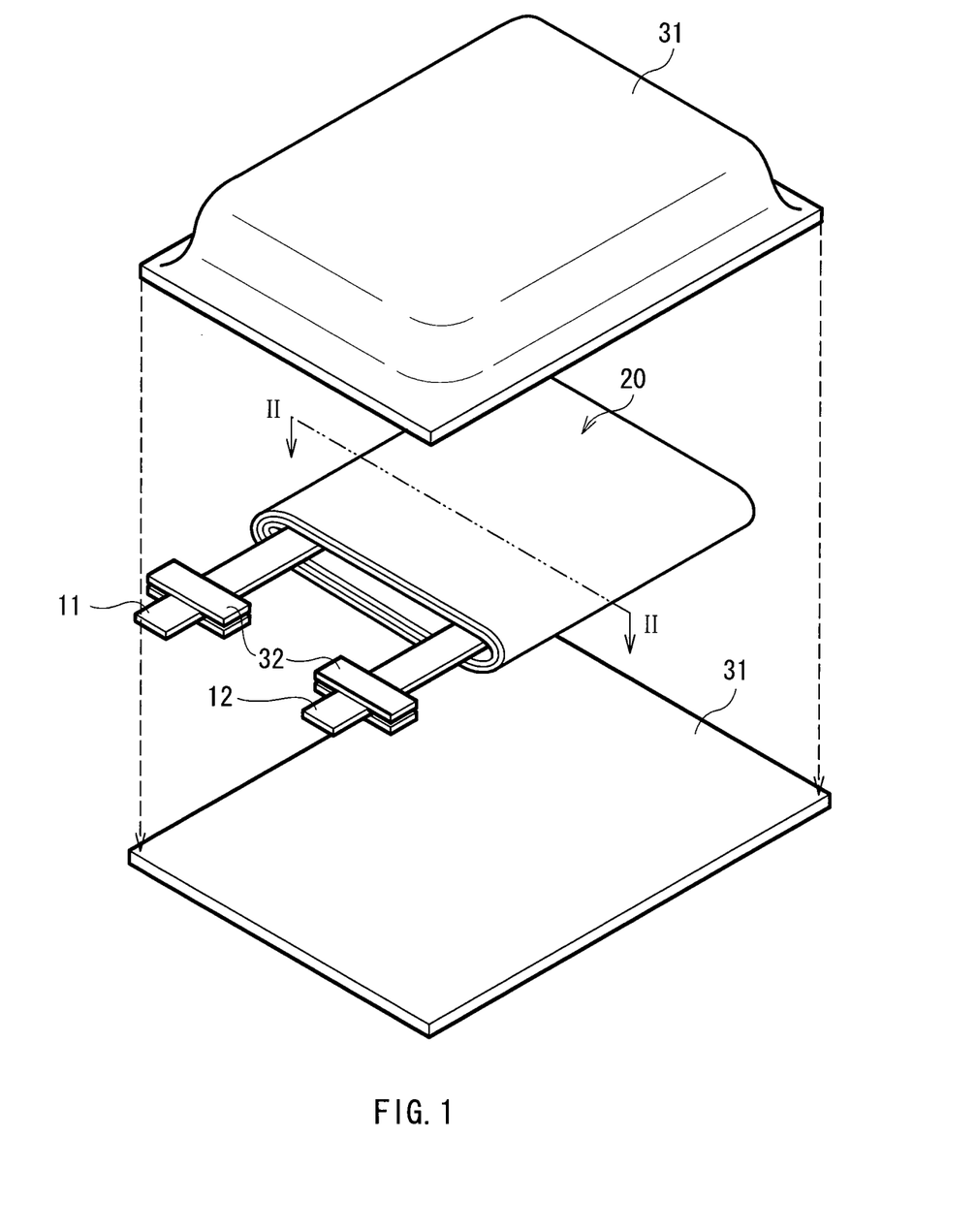
FIG. 1 is an exploded perspective view showing a structure of a secondary battery according to an embodiment of the invention.

FIG. 1 shows an example of an exploded structure of a secondary battery according to a first embodiment of the invention. The secondary battery is a so-called lithium ion secondary battery in which the capacity of the anode is expressed by a capacity component due to insertion and extraction of lithium as an electrode reactant. The secondary battery has a structure that a spirally wound electrode body 20 to which a cathode lead 11 and an anode lead 12 are attached is contained in a film package member 31.

The cathode lead 11 and the anode lead 12 are, for example, a strip shape, and respectively directed from inside to outside of the package member 31 in the same direction, for example. The cathode lead 11 is made of, for example, a metal material such as aluminum (Al). The anode lead 12 is made of a metal material such as nickel (Ni).

The package member 31 is made of a rectangular laminated film in which, for example, a nylon film, an aluminum foil, and a polypropylene film are bonded together in this order. The package member 31 is, for example, arranged so that the polyethylene film side faces the spirally wound electrode body 20, and the respective outer edges are contacted to each other by fusion bonding or an adhesive.

Adhesive films 32 to improve contact characteristics between the cathode lead 11/the anode lead 12 and inside of the package member 31 and to protect from entering of outside air are inserted between the package member 31 and the cathode lead 11/the anode lead 12. The adhesive film 32 is made of a material having contact characteristics to the cathode lead 11 and the anode lead 12, for example, is preferably made of a polyolefin resin such as polyethylene, polypropylene, modified polyethylene, and modified polypropylene when the cathode lead 11 and the anode lead 12 are made of the foregoing metal material.

Figure 2:
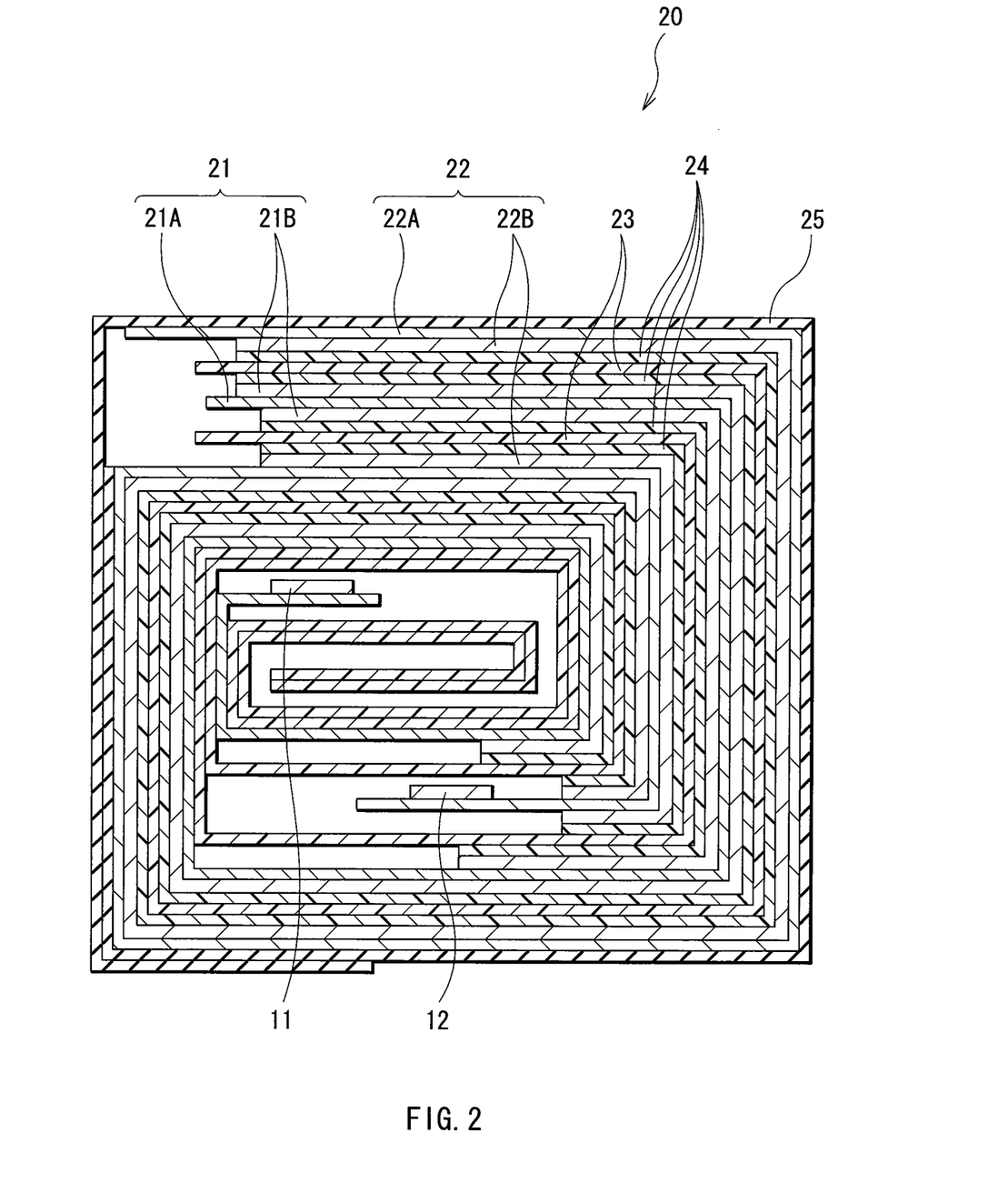
FIG. 2 is a cross section showing a structure taken along line II-II of a spirally wound electrode body shown in FIG. 1.

FIG. 2 shows a cross sectional structure taken along line II-II of the spirally wound electrode body 20 shown in FIG. 1. In the spirally wound electrode body 20, a cathode 21 and an anode 22 are layered with a separator 23 and an electrolyte 24 in between and spirally wound. The outermost periphery of the spirally wound electrode body 20 is protected by a protective tape 25.

The cathode 21 has, for example, a cathode current collector 21A and a cathode active material layer 21B provided on the both faces or one face of the cathode current collector 21A. In the cathode current collector 21A, for example, there is an exposed portion provided with no cathode active material layer 21B on one end thereof in the longitudinal direction. The cathode lead 11 is attached to the exposed portion. The cathode current collector 21A is made of a metal material such as aluminum.

The cathode active material layer 21B contains, for example, as a cathode active material, one or more cathode materials capable of inserting and extracting lithium as an electrode reactant. As the cathode material capable of inserting and extracting lithium, for example, a lithium-containing compound such as a lithium transition metal oxide, a lithium phosphorous oxide, a lithium nitride, and an intercalation compound containing lithium is appropriate. Two or more thereof may be used by mixing. In particular, to improve the energy density, the lithium complex oxide or the lithium phosphorous oxide expressed by general formulas of $Li_xMIO_2$ or $Li_yMIIPO_4$ is preferable. In the formula, MI and MII include one or more transition metals, and preferably include at least one of cobalt, nickel, manganese, iron (Fe), aluminum, vanadium (v), titanium (Ti), and zirconium (Zr). Values of x and y vary according to charge and discharge state of the battery, and are generally in the range of $0.05 \leq x \leq 1.10$ and $0.05 \leq y \leq 1.10$. As a specific example of the lithium complex oxide expressed by $Li_xMIO_2$, $LiCoO_2$, $LiNiO_2$, $LiNi_{0.5}Co_{0.5}O_2$, $LiNi_{0.5}Co_{0.2}Mn_{0.3}O_2$, $LiMn_2O_4$ having a spinel crystal structure or the like can be cited. As a specific example of the lithium phosphorous oxide expressed by $Li_yMIIPO_4$, $LiFePO_4$, $LiFe_{0.5}Mn_{0.5}PO_4$ and the like can be cited.

The cathode active material layer 21B contains, for example, an electrical conductor, and may contain a binder if necessary. As an electrical conductor, for example, a carbon material such as graphite, carbon black, and Ketjen black can be cited. One thereof may be used singly, or two or more thereof may be used by mixing. In addition to the carbon material, a metal material, a conductive polymer material or the like may be used, as long as such a material has conductivity. As a binder, for example, synthetic rubber such as styrene butadiene rubber, fluorinated rubber, and ethylene propylene diene rubber; or a polymer material such as polyvinylidene fluoride can be cited. One thereof may be used singly, or two or more thereof may be used by mixing.

The anode 22 has an anode current collector 22A and an anode active material layer 22B provided on the both faces or one face of the anode current collector 22A similarly to the cathode 21. In the anode current collector 22A, for example, there is an exposed portion not provided with the anode active material layer 22B on one end thereof in the longitudinal direction. The anode lead 12 is attached to the exposed portion. The anode current collector 22A is made of, for example, a metal material such as copper (Cu).

The anode active material layer 22B contains, for example, as an anode active material, one or more anode materials capable of inserting and extracting lithium as an electrode reactant. If necessary, the anode active material layer 22B may contain a binder similar to that of the cathode active material layer 21B.

As an anode material capable of inserting and extracting lithium, for example, a carbon material such as graphite, non-graphitizable carbon, and graphitizable carbon can be cited. The carbon material is preferably used, since a change in the crystal structure due to charge and discharge is very little, a high charge and discharge capacity can be obtained, and favorable charge and discharge cycle characteristics can be obtained. In particular, graphite is preferable, since the capacity is high and thereby a high energy density can be obtained.

As an anode material capable of inserting and extracting lithium, a material that can insert and extract lithium, and contains at least one of a metal element and a metalloid element as an element can be also cited, since thereby a high energy density can be obtained. Such an anode material may be a simple substance, an alloy, or a compound of the metal element; a simple substance, an alloy, or a compound of the metalloid element; or a material having one or more phases thereof at least in part can be cited. In the invention, the alloy includes an alloy containing one or more metal elements and one or more metalloid elements, in addition to an alloy including two or more metal elements. Further, the alloy may contain a nonmetal element. The texture thereof may be a solid solution, a eutectic crystal (eutectic), an intermetallic compound, or a texture in which two or more thereof coexist.

As the metal element or the metalloid element that composes the anode material, for example, magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium, yttrium (Y), palladium (Pd), or platinum (Pt) that can form an alloy with lithium can be cited. Such an element can be crystalline or amorphous.

Specially, an anode material containing a metal element or a metalloid element of Group 4B in the short period periodic table as an element is preferable. An anode material containing at least one of silicon and tin as an element is particularly preferable. Silicon and tin have a high ability to insert and extract lithium, and can provide a high energy density.

As an alloy of tin, for example, an alloy containing at least one selected from the group consisting of silicon, nickel, copper, iron, cobalt, manganese, zinc, indium, silver, titanium, germanium, bismuth, antimony (Sb), and chromium (Cr) as a second element other than tin can be cited. As an alloy of silicon, for example, an alloy containing at least one selected from the group consisting of tin, nickel, copper, iron, cobalt, manganese, zinc, indium, silver, titanium, germanium, bismuth, antimony, and chromium as a second element other than silicon can be cited.

As a compound of tin or a compound of silicon, for example, a compound containing oxygen (O) or carbon (C) can be cited. In addition to tin or silicon, the compound may contain the foregoing second element.

As an anode material capable of inserting and extracting lithium, other metal compound or a polymer material can be further cited. As other metal compound, an oxide such as iron oxide, ruthenium oxide, and molybdenum oxide, $Li_3N$ or the like can be cited. As a polymer material, polyacetylene or the like can be cited.

In the secondary battery, the capacity of the anode material capable of inserting and extracting lithium is larger than the capacity of the cathode 21. Therefore, lithium metal is not precipitated on the anode 22 during charge.

The separator 23 is made of, for example, a synthetic resin porous film made of polytetrafluoro ethylene, polypropylene, and polyethylene, or a ceramics porous film. The separator 23 may have a structure in which two or more porous films as the foregoing porous films are layered. Specially, a porous film made of polyolefin is preferable, since such a porous film has superior short preventive effect, and improves battery safety by shutdown effect. In particular, polyethylene is preferable as a material of the separator 23, since polyethylene can provide shutdown effect in the range from 100 deg C. to 160 deg C., and has superior electrochemical stability. Further, polypropylene is also preferable. In addition, any other resin having chemical stability can be used by being copolymerized with polyethylene or polypropylene, or being blended therewith.

The electrolyte layer 24 is a so-called gelatinous electrolyte, containing an electrolytic solution and a polymer compound holding the electrolytic solution. The electrolytic solution contains, for example, a nonaqueous solvent and an electrolyte salt dissolved in the nonaqueous solvent.

As a nonaqueous solvent, for example, ethylene carbonate, propylene carbonate, butylene carbonate, vinylene carbonate, γ-butyrolactone, γ-valerolactone, 1,2-dimethoxyethane, tetrahydrofuran, 2-methyl tetrahydrofuran, 1,3-dioxolan, 4-methyl-1,3-dioxolan, methyl acetate, methyl propionate, ethyl propionate, dimethyl carbonate, ethyl methyl carbonate, diethyl carbonate, sulfolane, dimethyl sulfoxide, trimethyl phosphate, or a compound in which at least part of hydrogen of the foregoing compound is substituted with halogen can be cited. Specially, 4-fluoro-1,3-dioxolan-2-one as a fluorine compound of ethylene carbonate is preferably contained. 4-fluoro-1,3-dioxolan-2-one can form a stable protective coat on the surface of the anode 22, and decomposition reaction of the solvent can be thereby prevented. The solvent may be used singly, or two or more thereof may be used by mixing.

As an electrolyte salt, for example, a lithium salt such as $LiAsF_6$, $LiPF_6$, $LiBF_4$, $LiClO_4$, $LiB(C_6H_5)_4$, $LiCH_3SO_3$, $LiCF_3SO_3$, $LiC(CF_3SO_2)_3$, $LiAlCl_4$, $Li_2SiF_6$, $LiCl$, and $LiBr$ can be cited. Specially, a lithium salt having a fluorine atom is preferable, since high conductivity can be thereby obtained. One of the electrolyte salts may be used singly, or two or more thereof may be used by mixing them.

The content of the electrolyte salt is preferably in the range from 0.5 mol/kg to 3.0 mol/kg to the solvent. When the content is out of the range, the ion conductivity is largely lowered, and thus there is a possibility that sufficient battery characteristics may not be obtained.

The electrolytic solution further contains a compound having proton scavenging capacity as an additive. For example, such a compound can effectively scavenge a free acid such as hydrofluoric acid generated by hydrolysis of 4-fluoro-1,3-dioxolan-2-one or the like. Thereby, even at the high temperatures, decomposition reaction of the electrolytic solution or the like can be prevented. As a compound having proton scavenging capacity, a nitrogen compound having an unshared electron pair can be cited, since the unshared electron pair in nitrogen of such a nitrogen compound can scavenge a free acid. Specially, hexamethyenetetramine expressed by the structural formula shown in Chemical formula 1, the cyclic compound shown in Chemical formula 2, or the cyclic compound shown in Chemical formula 3 is preferable. Thereby, higher effects can be obtained.

[Chemical formula 1]

[Chemical formula 2]

[Chemical formula 3]

In Chemical formula 2 and Chemical formula 3, R1, R2, R3 represent a hydrogen group or a substituent group. R2 and R3 may be identical with or different from each other. p and q respectively represent an integer number of 2 or more. As a substituent, for example, a halogen group, an alkyl group, an alkylene group, a phenyl group, a naphthyl group, or an alkoxy group can be cited.

As the cyclic compound shown in Chemical formula 2 and the cyclic compound shown in Chemical formula 3, 1,3,5 triazine shown in Chemical formula 4, 2,2,4,4,6,6-hexafluoro-1,3,5-triaza-2,4,6-triphosphorine shown in Chemical formula 5, or 2,2,4,4,6,6-hexachloro-1,3,5-triaza- 2,4,6-triphosphorine shown in Chemical formula 6 is preferable. Thereby, higher effects can be obtained.

[Chemical formula 4]

[Chemical formula 5]

[Chemical formula 6]

As a nitrogen compound having an unshared electron pair, the lithium salt shown in Chemical formula 7 is also preferable. As such a lithium salt, for example, imide lithium bis-trifluoromethanesulfonate shown in Chemical formula 8 or imide lithium bispentafluoroethanesulfonate shown in Chemical formula 9 can be cited.

[Chemical formula 7]

In the formula, m and n represent an integer number.

[Chemical formula 8]

[Chemical formula 9]

As a nitrogen compound having an unshared electron pair, 3-methyl-2-oxazolidinone shown in Chemical formula 10, 1,3-diacetyl-2-imidazolidinone shown in Chemical formula 11, N-methyl succinimide shown in Chemical formula 12, 5-fluoro-1,3-dimethyluracil shown in Chemical formula 13, triphenylamine shown in Chemical formula 14, pyridine shown in Chemical formula 15, pyrazine shown in Chemical formula 16 or the like can be cited.

[Chemical formula 10]

[Chemical formula 11]

[Chemical formula 12]

[Chemical formula 13]

[Chemical formula 14]

[Chemical formula 15]

[Chemical formula 16]

The concentration of the nitrogen compound in the electrolytic solution preferably satisfies Mathematical formula 2. In such a range, high effects can be obtained.

Concentration of 4-fluoro-1,3-dioxolan-2-one (mol/kg)/number of unshared electron pairs in nitrogen compound×0.4≤concentration of nitrogen compound (mol/kg)≤concentration of 4-fluoro-1, 3-dioxolan-2-one (mol/kg)/number of unshared electron pairs in nitrogen compound×1 [Mathematical formula 2]

Further, as a nitrogen compound having an unshared electron pair, hexaethylenetetramine expressed by the structure formula shown in Chemical formula 17 is particularly preferable. Such a compound is a tricyclic macrocage compound. In the compound, all unshared electron pairs of bridgehead position nitrogen atoms are coordinated in the center of a molecule, and a molecule vacancy with the high electron density exists. Thereby, hexaethylenetetramine has a high ability to scavenge a free acid such as a hydrofluoric acid. Further, the steric hindrance prevents the scavenged free acid from being reacted with the solvent or the like.

[Chemical formula 17]

The content of hexaethylenetetramine in the electrolytic solution is preferably in the range from 0.001 wt % to 5 wt %. When the content is low, effects to scavenge the free acid are not sufficient. When the content is high, the ion conductivity becomes lowered.

Any polymer compound may be used as long as the polymer compound absorbs and gelates the solvent. For example, a fluorinated polymer compound such as polyvinylidene fluoride and a copolymer of vinylidene fluoride and hexafluoropropylene, an ether polymer compound such as polyethylene oxide and a cross-linked body containing polyethylene oxide, a compound including polyacrylonitrile, polyacrylate, or polymethacrylate as a repeat unit or the like can be cited. In particular, in the terms of redox stability, the fluorinated polymer compound is desirable. One of the polymer compounds may be used singly, or two or more thereof may be used by mixing.

The secondary battery can be manufactured, for example, as follows.

First, for example, a cathode active material, a binder, and an electrical conductor are mixed to prepare a cathode mixture. The cathode mixture is dispersed in a solvent such as N-methyl-2-pyrrolidone to form cathode mixture slurry. Next, the both faces of the cathode current collector 21A or one face thereof is coated with the cathode mixture slurry, dried, and the resultant is compression-molded. Consequently, the cathode active material layer 21B is formed and the cathode 21 is formed. Subsequently, for example, the cathode lead 11 is attached to the cathode current collector 21A by, for example, ultrasonic welding or spot welding. After that, the electrolytic solution and the polymer compound are prepared, and the electrolyte layer 24 is formed on the cathode active material layer 21B, that is, the both faces of the cathode 21 or the one thereof.

Further, for example, an anode active material and a binder are mixed to prepare an anode mixture. The anode mixture is dispersed in a solvent such as N-methyl-2-pyrrolidone to form anode mixture slurry. Next, the both faces of the anode current collector 22A or one face thereof is coated with the anode mixture slurry and dried. Then, the resultant is compression-molded. Consequently, the anode active material layer 22B is formed and the anode 22 is formed. Subsequently, the anode lead 12 is attached to the anode current collector 22A by, for example, ultrasonic welding or spot welding. The electrolyte layer 24 is formed on the anode active material layer 22B, that is, the both faces of the anode 22 or the one face thereof in the same manner as in the cathode 21.

After that, the cathode 21 and the anode 22 each formed with the electrolyte layer 24 are layered with the separator 23 in between and are spirally wound. The protective tape 25 is adhered to the outermost periphery to form the spirally wound electrode body 20. Finally, for example, the spirally wound electrode body 20 is sandwiched between the package members 31, and the outer peripheral edges of the package members 31 are hermetically sealed by thermal fusion bonding or the like, and the spirally wound electrode body 20 is enclosed. Then, the adhesive films 32 are inserted between the cathode lead 11/anode lead 12 and the package member 31. Thereby, the secondary battery shown in FIGS. 1 and 2 is completed.

Further, the foregoing secondary battery may be fabricated as follows. First, the cathode 21 and the anode 22 are formed as described above, and the cathode lead 11 and the anode 12 are attached to the cathode 21 and the anode 22. After that, the cathode 21 and the anode 22 are layered with the separator 23 in between and are spirally wound. The protective tape 25 is adhered to the outermost periphery thereof, and a spirally wound electrode body is formed. Next, the spirally wound electrode body is sandwiched between the package members 31, the outermost peripheries except for one side are thermally fusion-bonded to obtain a pouched state, and the spirally wound electrode body is contained inside the package member 31. Subsequently, a composition of matter for electrolyte containing an electrolytic solution, a monomer as a raw material for the polymer compound, and if necessary other material such as a polymerization initiator and a polymerization inhibitor is prepared, which is injected into the package member 31.

After the composition of matter for electrolyte is injected, the opening of the package member 31 is thermally fusion-bonded and hermetically sealed in the vacuum atmosphere. Next, the resultant is heated to polymerize the monomer to obtain a polymer compound. Thereby, the gelatinous electrolyte layer 24 is formed, and the secondary battery shown in FIGS. 1 and 2 is assembled.

In the secondary battery, when charged, for example, lithium ions are extracted from the cathode 21 and inserted in the anode 22 through the electrolytic solution. When discharged, for example, the lithium ions are extracted from the anode 22, and inserted in the cathode 21 through the electrolytic solution. When 4-fluoro-1,3-dioxolan-2-one and the compound having proton scavenging capacity are contained in the electrolytic solution, a free acid such as hydrofluoric acid generated by hydrolysis of 4-fluoro-1,3-dioxolan-2-one or the like is effectively scavenged by the compound having proton scavenging capacity, and thereby the decomposition reaction of the electrolytic solution is prevented.

Further, when hexaethylenetetramine is contained in the electrolytic solution, a free acid is effectively scavenged, the reactivity thereof is lowered, and thus decomposition reaction of the electrolytic solution or the like is prevented.

As above, according to the secondary battery of this embodiment, since 4-fluoro-1,3-dioxolan-2-one and the compound having proton scavenging capacity are contained in the electrolytic solution, a free acid can be effectively scavenged by the compound having proton scavenging capacity, and thereby the decomposition reaction of the electrolytic solution or the like can be prevented. Therefore, swollenness of the battery can be suppressed.

Further, when the nitrogen compound having an unshared electron pair is contained as the compound having proton scavenging capacity, higher effects can be obtained.

Further, when the concentration of the nitrogen compound in the electrolytic solution satisfies Mathematical formula 2, higher effects can be obtained.

According to the electrolytic solution of this embodiment, since hexaethylenetetramine is contained therein, while a free acid is effectively scavenged, the reactivity thereof can be lowered. Therefore, according to the secondary battery of this embodiment using this electrolytic solution, decomposition reaction of the electrolytic solution or the like can be prevented, and the battery characteristics such as charge and discharge efficiency can be improved.

In particular, when the content of hexaethylenetetramine in the electrolytic solution is in the range from 0.001 wt % to 5 wt %, higher effects can be obtained.

Second Embodiment

A secondary battery according to a second embodiment of the invention is a secondary battery in which the anode capacity includes the capacity component due to insertion and extraction of lithium as an electrode reactant and the capacity component due to precipitation and dissolution of lithium, and is expressed by the sum thereof.

The secondary battery has a structure and effects similar to those of the secondary battery according to the first embodiment, except that the structure of the anode active material layer is different, and can be similarly manufactured. Therefore, here, descriptions will be given by using the same symbols with reference to FIG. 1 and FIG. 2. Detailed descriptions for the same components will be omitted.

In the anode active material layer 22B, for example, by setting the charge capacity of the anode material capable of inserting and extracting lithium to the value smaller than the charge capacity of the cathode 21, lithium metal begins to be precipitated on the anode 22 when the open circuit voltage (that is, battery voltage) is lower than the overcharge voltage during charge. Therefore, in the secondary battery, both the anode material capable of inserting and extracting lithium and lithium metal function as an anode active material, and the anode material capable of inserting and extracting lithium is a base material when the lithium metal is precipitated. As an anode material capable of inserting and extracting lithium, materials similar to those of the first embodiment can be cited. Specially, the carbon material capable of inserting and extracting lithium is preferable.

The overcharge voltage means the open circuit voltage when the battery becomes in an overcharge state. For example, the overcharge voltage means a higher voltage than the open circuit voltage of the battery, which is "fully charged," described in and defined by "Guideline for safety assessment of lithium secondary batteries" (SBA G1101), which is one of the guidelines specified by Japan Storage Battery industries association (Battery Association of Japan). In other words, the overcharge voltage means a higher voltage than the open circuit voltage after charge by using the charge method used in obtaining nominal capacities of each battery, the standard charge method, or a recommended charge method.

Thereby, in the secondary battery, a high energy density can be obtained, and improvement of the cycle characteristics and rapid charge characteristics that has been a challenging issue in the existing lithium metal secondary batteries can be attained. The secondary battery is similar to the existing lithium ion secondary batteries in terms of using the anode material capable of inserting and extracting lithium for the anode 22. Further, the secondary battery is similar to the existing lithium metal secondary batteries in terms of precipitation of lithium on the anode 22.

To more effectively obtain the foregoing characteristics, for example, the maximum precipitation capacity of lithium metal precipitated on the anode 22 at the time of the maximum voltage before the open circuit voltage becomes the overcharge voltage is preferably from 0.05 times to 3.0 times of the charge capacity ability of the anode material capable of inserting and extracting lithium. When lithium metal is precipitated too much, problems similar to those of the existing lithium metal secondary batteries are caused. Meanwhile, when lithium metal is precipitated too low, the charge and discharge capacity is not able to be sufficiently improved. Further, for example, the discharge capacity ability of the anode material capable of inserting and extracting lithium is preferably 150 mAh/g or more. The higher the ability to insert and extract lithium is, the relatively smaller the precipitation amount of lithium metal becomes. The charge capacity ability of the anode material is obtained by the electric quantity when discharge is performed by constant current and constant voltage method to 0 V for the electrochemical cell in which lithium metal is used as the anode and an anode material capable of inserting and extracting lithium is used as a cathode active material. The discharge capacity ability of the anode material is obtained, for example, by the electric quantity when charge is performed to 2.5 V for 10 hours or more by constant current method subsequently after the foregoing charge.

In the secondary battery, when charged, lithium ions are extracted from the cathode 21, and firstly inserted in the anode material capable of inserting and extracting lithium contained in the anode 22 through the electrolytic solution. When further charged, in a state that the open circuit voltage is lower than the overcharge voltage, lithium metal begins to be precipitated on the surface of the anode material capable of inserting and extracting lithium. After that, until charge is finished, lithium metal continues to be precipitated on the anode 22. Next, when discharged, first, lithium metal precipitated on the anode 22 is eluted as ions, which are inserted in the cathode 21 through the electrolytic solution. When further discharged, lithium ions inserted in the anode material capable of inserting and extracting lithium in the anode 22 are extracted, and inserted in the cathode 21 through the electrolytic solution. When 4-fluoro-1,3-dioxolan-2-one and the compound having proton scavenging capacity are contained in the electrolytic solution, a free acid such as hydrofluoric acid generated by hydrolysis of 4-fluoro-1,3-dioxolan-2-one or the like is effectively scavenged by the compound having proton scavenging capacity, and thereby the decomposition reaction of the electrolytic solution is prevented.

Further, when hexaethylenetetramine is contained in the electrolytic solution, a free acid is effectively scavenged, the reactivity thereof is lowered, and thus decomposition reaction of the electrolytic solution or the like is prevented.

EXAMPLES

Further, specific examples of the invention will be described in detail.

Examples 1-1 to 1-13

Batteries in which the anode capacity was expressed by the capacity component due to insertion and extraction of lithium, that is, so-called lithium ion secondary batteries were fabricated.

First, lithium cobaltate ($LiCoO_2$) as a cathode active material, graphite as an electrical conductor, polyvinylidene fluoride as a binder were mixed to prepare a cathode mixture. Subsequently, the cathode mixture was dispersed in N-methyl-2-pyrrolidone as a solvent to obtain cathode mixture slurry. After that, the cathode current collector 21A made of an aluminum foil was uniformly coated with the cathode mixture slurry, which was dried and compression-molded by a rolling press machine to form the cathode active material layer 21B and thereby forming the cathode 21. After that, the cathode lead 11 was attached to the cathode current collector 21A.

Further, artificial graphite as an anode active material and polyvinylidene fluoride as a binder were mixed to prepare an anode mixture. The anode mixture was dispersed in N-methyl-2-pyrrolidone as a solvent to obtain anode mixture slurry. After that, the anode current collector 22A made of a copper foil was uniformly coated with the anode mixture slurry, which was dried and compression-molded by a rolling press machine to form the anode active material layer 22B and thereby forming the anode 22. The capacity ratio between the cathode 21 and the anode 22 was designed so that the capacity of the anode 22 was expressed by the capacity component due to insertion and extraction of lithium. After that, the anode lead 12 was attached to the anode current collector 22A.

Subsequently, an electrolytic solution was formed as follows. $LiPF_6$ as an electrolyte salt was dissolved in a solvent in which ethylene carbonate and propylene carbonate as a solvent were mixed at a weight ratio of ethylene carbonate: propylene carbonate=6:4. Further, 4-fluoro-1,3-dioxolan-2-one and an additive were mixed therewith to prepare an electrolytic solution. The concentration of $LiPF_6$ in the electrolytic solution was 0.7 mol/kg. The concentration of 4-fluoro-1,3-dioxolan-2-one was 0.1 mol/kg. The concentration of the additive was 0.06 mol/kg. Further, the additive was a nitrogen compound having an unshared electron pair. Specifically, hexamethylenetetramine was used in Example 1-1, 3-methyl-2-oxazolidinone was used in Example 1-2, 1,3-diacetyl-2-imidazolidinone was used in Example 1-3, N-methyl succinimide was used in Example 1-4, 5-fluoro-1,3-dimethyluracil was used in Example 1-5, triphenylamine was used in Example 1-6, imide lithium bistrifluoromethanesulfonate was used in Example 1-7, imide lithium bispentafluoroethanesulfonate was used in Example 1-8, pyridine was used in Example 1-9, pyrazine was used in Example 1-10, 1,3,5-triazine was used in Example 1-11, 2,2,4,4,6,6-hexafluoro-1,3,5-toriaza-2,4,6-triphosphorine was used in Example 1-12, and 2,2,4,4,6,6-hexachloro-1,3,5-triaza-2,4,6-triphosphorine was used in Example 1-13.

Next, the obtained electrolytic solution was held by a copolymer of hexafluoropropylene and vinylidene fluoride as a polymer compound. Thereby, the gelatinous electrolyte layer 24 was respectively formed on the cathode 21 and the anode 22. The ratio of hexafluoropropylene in the copolymer was 6.9 wt %.

After that, the cathode 21 and the anode 22 each formed with the electrolyte layer 24 were layered with the separator 23 made of a polyethylene film being 20 μm thick in between and spirally wound to form the spirally wound electrode body 20.

The obtained spirally wound electrode body 20 was sandwiched between the package member 31 made of a laminated film, and inserted therein under the reduced pressure. Thereby, the secondary battery shown in FIG. 1 and FIG. 2 was fabricated.

As Comparative example 1-1 relative to Examples 1-1 to 1-13, a secondary battery was fabricated in the same manner as in Examples 1-1 to 1-13, except that the additive was not added.

For the obtained secondary batteries of Examples 1-1 to 1-13 and Comparative example 1-1, high temperature storage characteristics were examined as follows. First, after constant current charge of 1C was performed under the environment of 23 deg C. until the upper limit of 4.2 V, constant voltage charge was performed at 4.2 V. The total charge time was 3 hours. Subsequently, the secondary batteries were stored for 1 month under the environment of 60 deg C. For the high temperature storage characteristics, the swollenness ratio stored at high temperatures was obtained as [(thickness after storage−thickness before storage)/thickness before storage]× 100(%). The results are shown in Table 1. 1C is the current value at which the theoretical capacity is discharged completely in 1 hour.

TABLE 1

| | Additive | Swollenness ratio (%) |
|---|---|---|
| Example 1-1 | Hexamethylenetetramine | 1.8 |
| Example 1-2 | 3-methyl-2-oxazolidinone | 7.2 |
| Example 1-3 | 1,3-diacetyl-2-imidazolidinone | 8.7 |
| Example 1-4 | N-methyl succinimide | 8.1 |
| Example 1-5 | 5-fluoro-1,3-dimethyluracil | 3.5 |
| Example 1-6 | Triphenylamine | 7.0 |
| Example 1-7 | Imide lithium bistrifluoromethanesulfonate | 4.3 |

TABLE 1-continued

| | Additive | Swollenness ratio (%) |
|---|---|---|
| Example 1-8 | Imide lithium bispentafluoroethanesulfonate | 6.6 |
| Example 1-9 | Pyridine | 6.2 |
| Example 1-10 | Pyrazine | 4.2 |
| Example 1-11 | 1,3,5 triazine | 3.1 |
| Example 1-12 | 2,2,4,4,6,6-hexafluoro-1,3,5-toriaza-2,4,6-triphosphorine | 2.8 |
| Example 1-13 | 2,2,4,4,6,6-hexachloro-1,3,5-triaza-2,4,6-triphosphorine | 3.0 |
| Comparative example 1-1 | None | 51.2 |

As evidenced by Table 1, according to Examples 1-1 to 1-13 using the nitrogen compound having an unshared electron pair, the swollenness ratio when stored at high temperatures was lowered.

That is, it was found that when the compound having proton scavenging capacity was contained in the electrolytic solution, the swollenness of the battery could be suppressed even when stored at high temperatures.

Examples 2-1 to 2-5 and 3-1 to 3-5

As Examples 2-1 to 2-5, secondary batteries were fabricated in the same manner as in Example 1-1, except that the concentration of the additive in the electrolytic solution was changed in the range from 0.05 mol/kg to 0.5 mol/kg as shown in Table 2. The concentration of 4-fluoro-1,3-dioxolan-2-one in the electrolytic solution was 0.1 mol/kg. The number of unshared electron pairs in hexamethylenetetramine used as the additive was 4 pairs. In Mathematical formula 2, [concentration of 4-fluoro-1,3-dioxolan-2-one (mol/kg)/number of unshared electron pairs in nitrogen compound]×0.4 was 0.01 mol/kg, and [concentration of 4-fluoro-1,3-dioxolan-2-one (mol/kg)/number of unshared electron pairs in nitrogen compound]×10 was 0.25 mol/kg.

TABLE 2

| | Additive | | |
|---|---|---|---|
| | Kind | Concentration (mol/kg) | Swollenness ratio (%) |
| Example 2-1 | Hexamethylenetetramine | 0.5 | 12.3 |
| Example 2-2 | | 0.25 | 2.6 |
| Example 2-3 | | 0.1 | 1.7 |
| Example 1-1 | | 0.06 | 1.8 |
| Example 2-4 | | 0.01 | 3.7 |
| Example 2-5 | | 0.005 | 10.1 |
| Comparative example 1-1 | None | 0 | 51.2 |

4-fluoro-1,3-dioxolan-2-one: 0.1 mol/kg

As Examples 3-1 to 3-5, secondary batteries were fabricated in the same manner as in Example 1-1, except that the concentration of the additive in the electrolytic solution was changed in the range from 0.05 mol/kg to 0.5 mol/kg as shown in Table 3. The concentration of 4-fluoro-1,3-dioxolan-2-one in the electrolytic solution was 0.2 mol/kg. In Mathematical formula 2, [concentration of 4-fluoro-1,3-dioxolan-2-one (mol/kg)/number of unshared electron pairs in nitrogen compound]×0.4 was 0.02 mol/kg, and [concentration of 4-fluoro-1,3-dioxolan-2-one (mol/kg)/number of unshared electron pairs in nitrogen compound]×10 was 0.5 mol/kg.

TABLE 3

| | Additive | | |
|---|---|---|---|
| | Kind | Concentration (mol/kg) | Swollenness ratio (%) |
| Example 3-1 | Hexamethylenetetramine | 0.5 | 3.5 |
| Example 3-2 | | 0.25 | 2.9 |
| Example 3-3 | | 0.1 | 2.0 |
| Example 3-4 | | 0.01 | 9.2 |
| Example 3-5 | | 0.005 | 15.1 |

4-fluoro-1,3-dioxolan-2-one: 0.2 mol/kg

As evidenced by Tables 2 and 3, according to Examples 1-1 and 2-2 to 2-4 in which the concentration of hexamethylenetetramine in the electrolytic solution was in the range from 0.01 mol/kg to 0.25 mol/kg, or according to Examples 3-1 to 3-3 in which the concentration of hexamethylenetetramine in the electrolytic solution was in the range from 0.02 mol/kg to 0.5 mol/kg, the swollenness ratio when stored at high temperatures was lower than that of Examples 2-1 and 2-5 or Examples 3-4 and 3-5 in which the concentration of hexamethylenetetramine in the electrolytic solution was out of the range.

That is, it was found that the concentration of hexamethylenetetramine as an additive was preferably in the range of Mathematical formula 2.

Examples 4-1 to 4-5 and 5-1 to 5-5

As Examples 4-1 to 4-5, secondary batteries were fabricated in the same manner as in Example 1-7, except that the concentration of the additive in the electrolytic solution was changed in the range from 0.02 mol/kg to 2.0 mol/kg as shown in Table 4. The concentration of 4-fluoro-1,3-dioxolan-2-one in the electrolytic solution was 0.1 mol/kg. The number of unshared electron pairs in bis trifluoro methane sulfonic imido lithium used as the additive was 1 pair. In Mathematical formula 2, [concentration of 4-fluoro-1,3-dioxolan-2-one (mol/kg)/number of unshared electron pairs in nitrogen compound]×0.4 was 0.04 mol/kg, and [concentration of 4-fluoro-1,3-dioxolan-2-one (mol/kg)/number of unshared electron pairs in nitrogen compound]×10 was 1.0 mol/kg.

TABLE 4

| | Additive | | |
|---|---|---|---|
| | Kind | Concentration (mol/kg) | Swollenness ratio (%) |
| Example 4-1 | Bis trifluoro methane sulfonic acid imide lithium | 2.0 | 7.7 |
| Example 4-2 | | 1.0 | 3.3 |
| Example 4-3 | | 0.4 | 3.3 |
| Example 1-7 | | 0.06 | 4.3 |
| Example 4-4 | | 0.04 | 5.8 |
| Example 4-5 | | 0.02 | 13.2 |
| Comparative example 1-1 | N/A | 0 | 51.2 |

4-fluoro-1,3-dioxolan-2-one: 0.1 mol/kg

As Examples 5-1 to 5-5, secondary batteries were fabricated in the same manner as in Example 1-7, except that the concentration of the additive in the electrolytic solution was changed in the range from 0.02 mol/kg to 2.0 mol/kg as shown in Table 5. The concentration of 4-fluoro-1,3-dioxolan-2-one in the electrolytic solution was 0.2 mol/kg. In Mathematical formula 2, [concentration of 4-fluoro-1,3-dioxolan-2-one (mol/kg)/number of unshared electron pairs in nitrogen compound]×0.4 was 0.08 mol/kg, and [concentration of 4-fluoro-1,3-dioxolan-2-one (mol/kg)/number of unshared electron pairs in nitrogen compound]×10 was 2.0 mol/kg.

TABLE 5

| | Additive | | |
|---|---|---|---|
| | Kind | Concentration (mol/kg) | Swollenness ratio (%) |
| Example 5-1 | Bis trifluoro methane sulfonic acid imide lithium | 2.0 | 3.8 |
| Example 5-2 | | 1.0 | 3.9 |
| Example 5-3 | | 0.4 | 4.0 |
| Example 5-4 | | 0.04 | 10.4 |
| Example 5-5 | | 0.02 | 18.7 |

4-fluoro-1,3-dioxolan-2-one: 0.2 mol/kg

As evidenced by Tables 4 and 5, according to Examples 1-7 and 4-2 to 4-4 in which the concentration of imide lithium bistrifluoromethanesulfonate in the electrolytic solution was in the range from 0.04 mol/kg to 1.0 mol/kg, or according to Examples 5-1 to 5-3 in which the concentration of imide lithium bistrifluoromethanesulfonate in the electrolytic solution was in the range from 0.08 mol/kg to 2.0 mol/kg, the swollenness ratio when stored at high temperatures was lower than that of Examples 4-1 and 4-5 or Examples 5-4 and 5-5 in which the concentration of imide lithium bistrifluoromethanesulfonate in the electrolytic solution was out of the range.

That is, it was found that even other additive was preferably used, as long as the concentration of such other additive was in the range of Mathematical formula 2.

Examples 6-1 and 6-2

The secondary batteries shown in FIGS. 1 and 2 were fabricated. First, lithium cobaltate ($LiCoO_2$) as a cathode active material, graphite as an electrical conductor, polyvinylidene fluoride as a binder were mixed to prepare a cathode mixture. The cathode mixture was dispersed in N-methyl-2-pyrrolidone as a solvent to obtain cathode mixture slurry. After that, the cathode current collector 21A made of an aluminum foil was uniformly coated with the cathode mixture slurry, which was dried and compression-molded by a rolling press machine to form the cathode active material layer 21B and thereby forming the cathode 21. After that, the cathode lead 11 was attached to the cathode current collector 21A.

Further, mesocarbon microbead (MCMB) as an anode active material and polyvinylidene fluoride as a binder were mixed to prepare an anode mixture. The anode mixture was dispersed in N-methyl-2-pyrrolidone as a solvent to obtain anode mixture slurry. After that, the anode current collector 22A made of a copper foil was uniformly coated with the anode mixture slurry, which was dried and compression-molded by a rolling press machine to form the anode active material layer 22B and thereby forming the anode 22. After that, the anode lead 12 was attached to the anode current collector 22A.

Subsequently, an electrolytic solution was formed as follows. $LiPF_6$ as an electrolyte salt was dissolved in a solvent in which ethylene carbonate and propylene carbonate as a solvent were mixed at a weight ratio of ethylene carbonate: propylene carbonate=1:1. Further, an additive was mixed therewith to form an electrolytic solution. The concentration of $LiPF_6$ in the electrolytic solution was 1 mol/kg. As the additive, hexaethylenetetramine was used in Example 6-1 and hexamethylenetetramine was used in Example 6-2. The content of the additive in the electrolytic solution was 0.5 wt %. In hexamethylenetetramine, as shown in Chemical formula 1, the unshared electron pair of the nitrogen atom is oriented toward outside of the molecule.

Next, the obtained electrolytic solution was held by a copolymer of hexafluoropropylene and vinylidene fluoride as a polymer compound. Thereby, the gelatinous electrolyte layer 24 was respectively formed on the cathode 21 and the anode 22. The ratio of hexafluoropropylene in the copolymer was 6.9 wt %.

After that, the cathode 21 and the anode 22 each formed with the electrolyte layer 24 were layered with the separator 23 made of a polyethylene film being 20 μm thick in between and spirally wound to form the spirally wound electrode body 20.

The obtained spirally wound electrode body 20 was sandwiched between the package member 31 made of a laminated film, and inserted therein under the reduced pressure. Thereby, the secondary battery shown in FIG. 1 and FIG. 2 was fabricated.

As Comparative example 6-1 relative to Examples 6-1 and 6-2, a secondary battery was formed in the same manner as in Examples 6-1 and 6-2, except that hexaethylenetetramine or hexamethylenetetramine was not mixed as an additive.

For the fabricated secondary batteries of Examples 6-1 and 6-2 and Comparative example 6-1, cycle characteristics and high temperature storage characteristics were examined.

Figure 3:
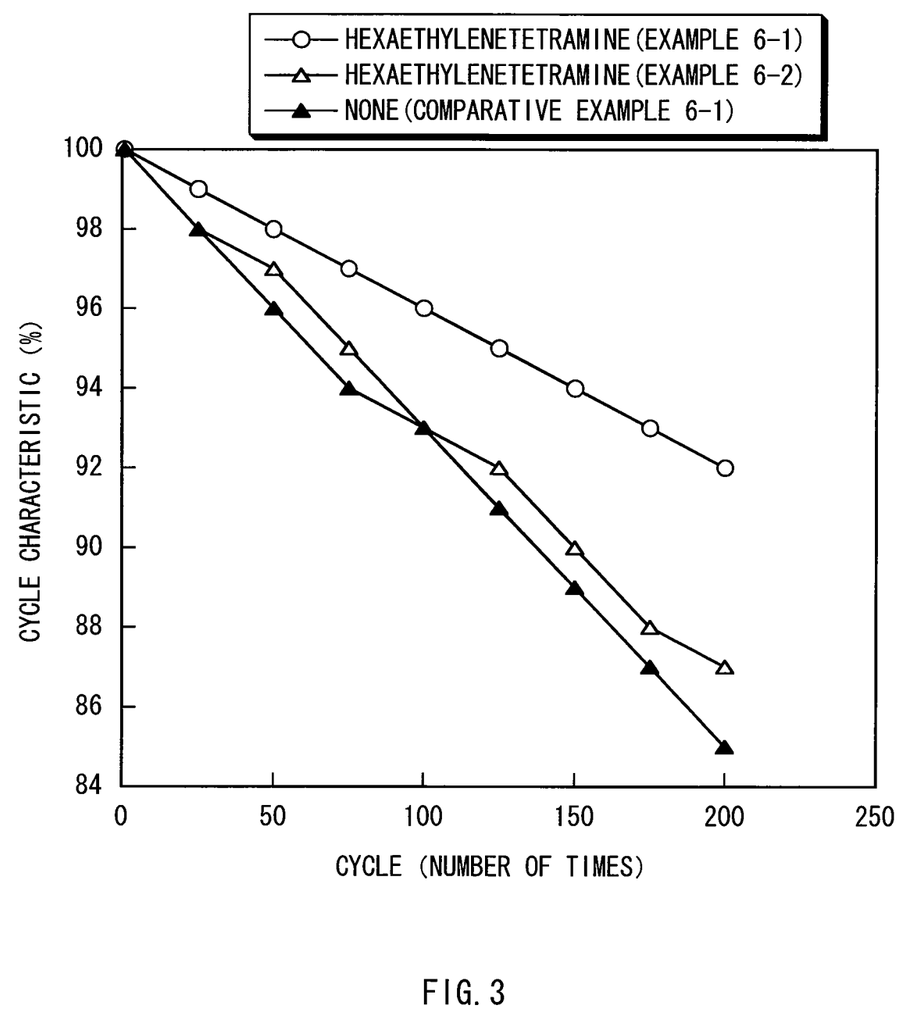
FIG. 3 is a characteristic diagram showing an example of cycle characteristics of secondary batteries fabricated in examples.

For the cycle characteristics, charge and discharge in which after constant current and constant voltage charge of 1 C at 23 deg C. was performed until the upper limit of 4.2 V for 2.5 hours as the total charge time, constant current discharge of 1 C at 23 deg C. was performed until the final voltage of 3.0 V were repeated. The cycle characteristics were obtained as the discharge capacity ratio in each cycle to the discharge capacity in the first cycle, that is, (discharge capacity in each cycle/discharge capacity in the first cycle)×100 (%). The results are shown in FIG. 3.

Figure 4:
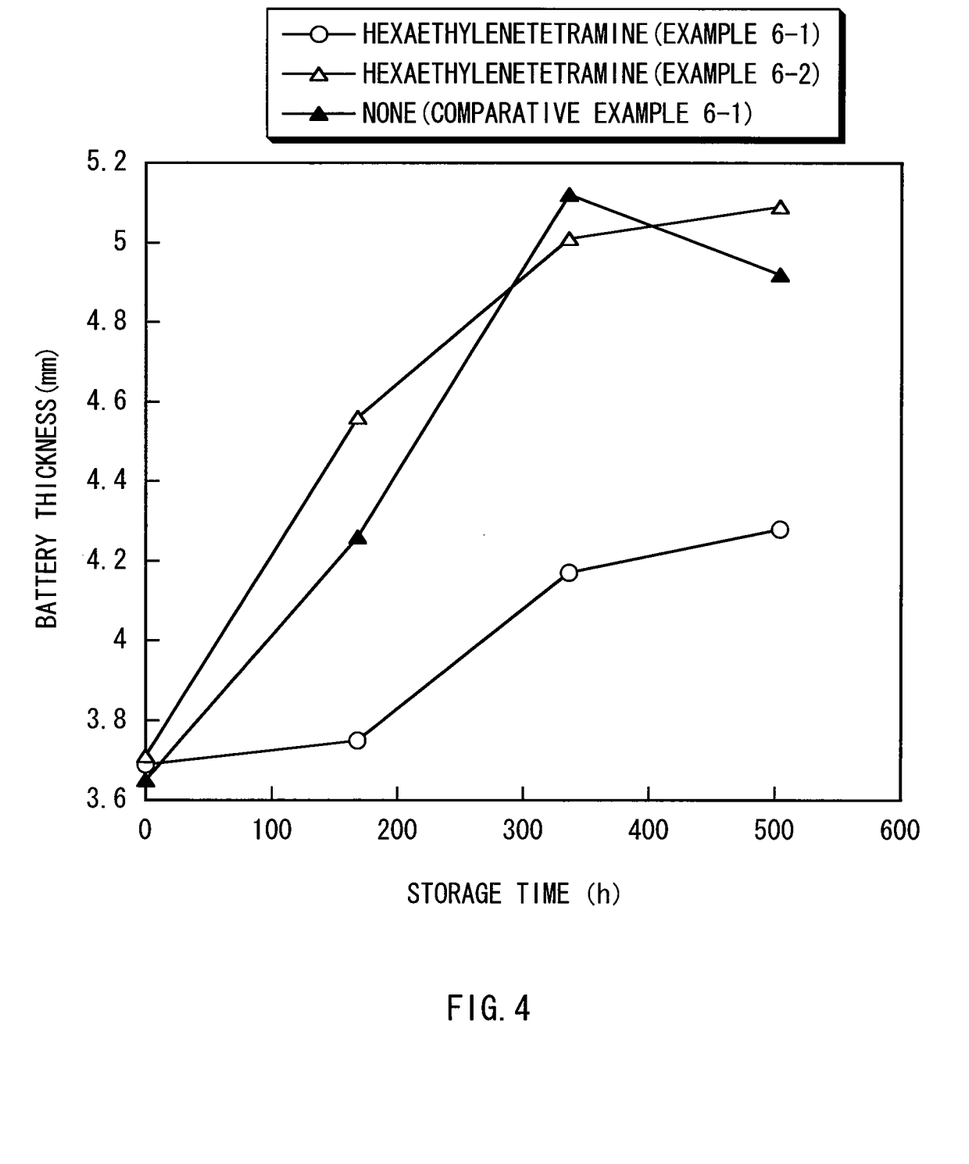
FIG. 4 is a characteristic diagram showing a relation between the high temperature storage time and the battery thickness of the secondary batteries fabricated in the examples.

For the high temperature storage characteristics, the thickness of the battery and the discharge capacity retention ratio were obtained as follows. First, constant current and constant voltage charge of 1 C at 23 deg C. was performed until the upper limit of 4.2 V for 2.5 hours as the total charge time. After that, constant current discharge of 1 C at 23 deg C. was performed until the final voltage of 3.0 V, and the discharge capacity before storage was obtained. Subsequently, constant current and constant voltage charge of 1 C at 23 deg C. was performed until the upper limit of 4.31 V for 2.5 hours as the total charge time to obtain an overcharge state. After that, the battery was stored in a constant temperature bath set at 60 deg C., and the thickness of the battery to the storage time was measured. Next, after the battery was stored in the constant temperature bath set at 60 deg C. for 28 days, constant current discharge of 1 C at 23 deg C. was performed until the final voltage of 3.0 V. Subsequently, constant current and constant voltage charge of 1C at 23 deg C. was performed until the upper limit of 4.2 V again for 2.5 hours as the total charge time. After that, constant current discharge of 1 C at 23 deg C. was performed until the final voltage of 3.0 V, and the discharge capacity after storage was obtained. The discharge capacity retention ratio was obtained as the ratio of the discharge capacity after storage to the discharge capacity before storage, that is, (discharge capacity after storage/discharge capacity before storage)×100 (%). The results are shown in FIG. 4 and Table 6.

TABLE 6

|  | Discharge capacity retention ratio (%) |
| --- | --- |
| Example 6-1 | 95 |
| Example 6-2 | 80 |
| Comparative example 6-1 | 78 |

Meanwhile, $LiPF_6$ was dissolved in each solvent of propylene carbonate, ethylene carbonate, γ-butyrolactone, dimethyl carbonate, diethyl carbonate, or methyl ethyl carbonate so that the concentration of $LiPF_6$ became 1 mol/l. Further, hexaethylenetetramine or hexamethylenetetramine was further mixed therewith to prepare an electrolytic solution. The content of hexaethylenetetramine or hexamethylenetetramine in the electrolytic solution was 0.5 wt %. Further, an electrolytic solution in which $LiPF_6$ was dissolved in each solvent of propylene carbonate, ethylene carbonate, γ-butyrolactone, dimethyl carbonate, diethyl carbonate, or methyl ethyl carbonate so that the concentration of $LiPF_6$ became 1 mol/l was prepared. 50 ml of each electrolytic solution was hermetically contained in a stainless pressure tight case, retained for 100 hours at 80 deg C. After that, the concentration of hydrofluoric acid (HF) was measured by alkalimetry. The results are shown in Table 7.

TABLE 7

| | HF concentration (wt ppm) | | | | | |
| --- | --- | --- | --- | --- | --- | --- |
| Additive | Propylene carbonate | Ethylene carbonate | γ-butyrolactone | Dimethyl carbonate | Diethyl carbonate | Methylethyl carbonate |
| Hexaethylenetetramine | 10 | 31 | 5 | 6 | 10 | 34 |
| Hexamethylenetetramine | 13 | 30 | 4 | 8 | 13 | 36 |
| None | 175 | 206 | 149 | 190 | 174 | 320 |

As evidenced by Table 7, when the electrolytic solution mixed with hexaethylenetetramine was stored at high temperatures, the concentration of hydrofluoric acid could be lower than that of the electrolytic solution added no hexaethylenetetramine or hexamethylenetetramine, as well as in the case of the electrolytic solution mixed with hexamethylenetetramine. Further, both the electrolytic solution mixed with hexaethylenetetramine and the electrolytic solution mixed with hexamethylenetetramine could lower the concentration of hydrofluoric acid equally.

Meanwhile, as evidenced by Table 6 and FIGS. 3 and 4, when the battery was formed, in Example 6-1 in which hexaethylenetetramine was contained in the electrolytic solution, the cycle characteristics were improved, and decrease in the swollenness and the discharge capacity was smaller at high temperatures, compared to Comparative example 6-2 containing hexamethylenetetramine and Comparative example 6-1 not containing hexaethylenetetramine or hexamethylenetetramine.

That is, it was found that when hexaethylenetetramine was contained in the electrolytic solution, a free acid such as hydrofluoric acid could be scavenged, and particularly in the battery, such an effect could be obtained even when the oxidation atmosphere became stronger due to charge and discharge.

Examples 7-1 to 7-6

Secondary batteries were fabricated in the same manner as in Example 6-1, except that the content of hexaethylenetetramine in the electrolytic solution was 0.001 wt %, 0.01 wt %, 0.1 wt %, 1 wt %, 5 wt %, or 10 wt %.

Figure 5:
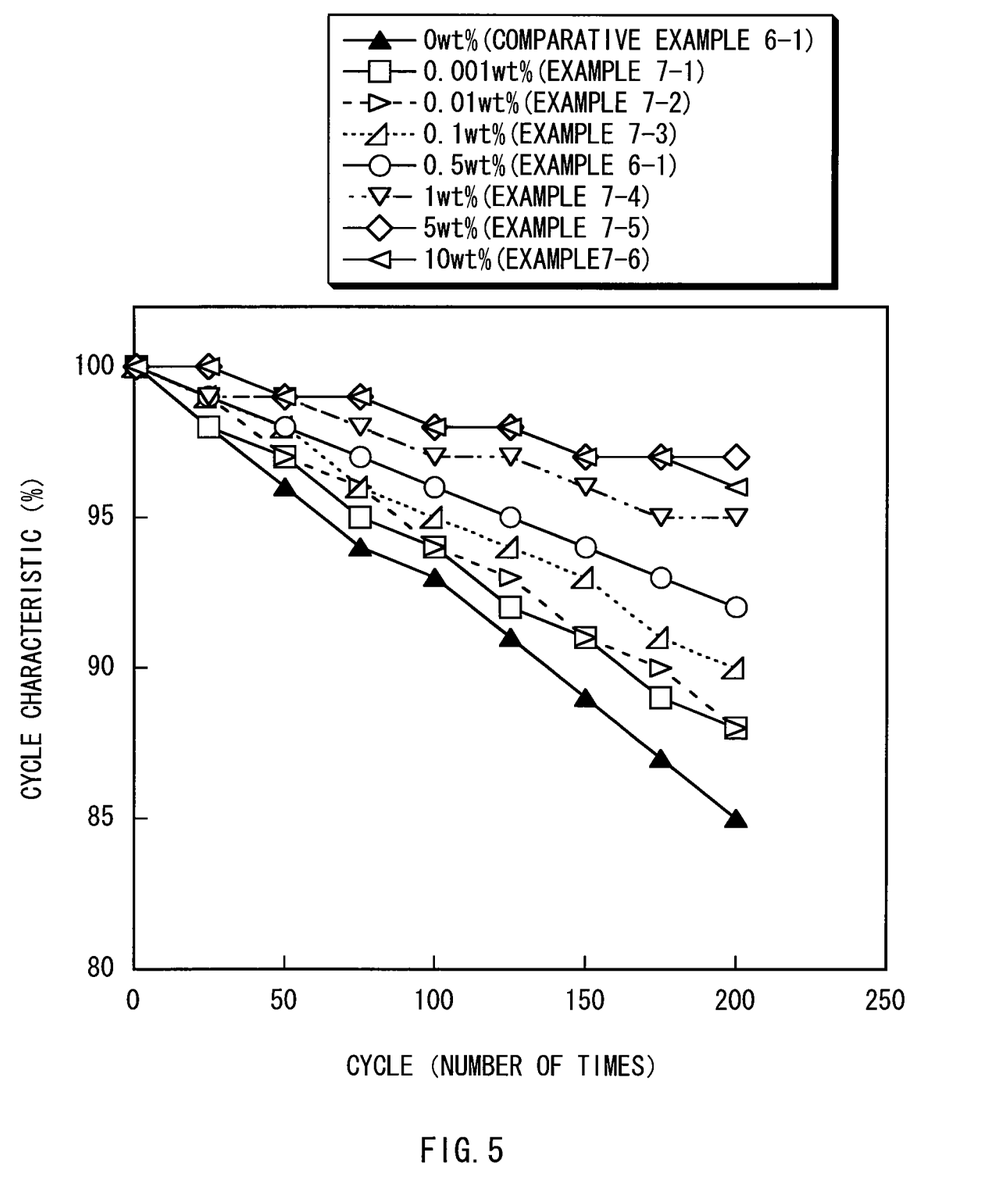
FIG. 5 is another characteristic diagram showing an example of cycle characteristics of secondary batteries fabricated in examples.

For the fabricated secondary batteries of Examples 7-1 to 7-6, the cycle characteristics were examined in the same manner as in Examples 6-1 and 6-2. The results are shown in FIG. 5 together with the results of Example 6-1 and Comparative example 6-1. Further, the ion conductivity was also examined.

As evidenced by FIG. 5, as the content of hexaethylenetetramine in the electrolytic solution was increased, the cycle characteristics were improved, and became approximately constant when the content of hexaethylenetetramine in the electrolytic solution exceeded 5 wt %. Meanwhile, as the content of hexaethylenetetramine in the electrolytic solution was increased, the ion conductivity decreased.

That is, it was found that the content of hexaethylenetetramine in the electrolytic solution was preferably in the range from 0.001 wt % to 5 wt %.

The invention has been described with reference to the embodiments and the examples. However, the invention is not limited to the foregoing embodiments and the foregoing examples, and various modifications may be made. For example, in the foregoing embodiments and the foregoing examples, the descriptions have been given of the specific example of the secondary battery having the spirally wound structure. However, the invention can be similarly applied to a secondary battery having a structure in which a cathode and an anode are folded or a secondary battery having other lamination structure in which a cathode and an anode are layered.

Further, in the foregoing embodiments and the foregoing examples, the descriptions have been given of the case using lithium as an electrode reactant. However, the invention can be also applied to the case using other element in Group 1 in the long period periodic table such as sodium (Na) and potassium (K); other element in Group 2 in the long period periodic table such as magnesium and calcium (Ca); other light metal such as aluminum; or an alloy of lithium or the foregoing element. In that case, similar effects can be also obtained. The cathode active material capable of inserting and extracting the electrode reactant, a solvent or the like can be selected according to the electrode reactant.

Further, in the foregoing embodiments and the foregoing examples, descriptions have been given of the case using the gelatinous electrolyte in which the electrolytic solution is held in the polymer compound. However, other electrolyte may be used instead of the foregoing electrolyte. As other electrolyte, for example, an electrolyte including only an electrolytic solution, a mixture of a solid electrolyte having ion conductivity and an electrolytic solution, or a mixture of a solid electrolyte and a gelatinous electrolyte can be cited.

As a solid electrolyte, for example, a polymer solid electrolyte in which an electrolyte salt is dispersed in a polymer compound having ion conductivity, or an inorganic solid electrolyte made of ion conductive glass, ionic crystal or the like can be used. As a polymer compound, for example, an ether polymer compound such as polyethylene oxide and a cross-linked body containing polyethylene oxide, or an ester polymer compound such as polymethacrylate and polyacrylate can be used singly, by mixing, or by copolymerization in the molecule. As an inorganic solid electrolyte, lithium nitride, lithium iodide or the like can be used.

Further, in the foregoing embodiments and the foregoing examples, descriptions have been given of the case using a film for the package member 31. However, the invention can be applied to secondary batteries having other shape such as a cylinder, a coin, and a button that use a metal container for the package member. In that case, similar effects can be obtained. In addition, the invention can be applied to primary batteries in addition to the secondary batteries.

The invention claimed is:

1. A battery comprising:
a cathode;
an anode; and
an electrolytic solution; and
a film package member containing the cathode, the anode and the electrolytic solution,
wherein,
the electrolytic solution contains 4-fluoro-1,3-dioxolan-2-one and a nitrogen compound having an unshared electron,
the nitrogen compound includes at least one selected from the group consisting of hexamethylenetetramine, a cyclic compound shown in Chemical formula 5, and a cyclic compound shown in Chemical formula 6, Chemical formulae 5-6 being:

[Chemical formula 5]

where R1 represents hydrogen or a substituent and p represents an integer number of 2 or more, and

[Chemical formula 6]

where R2 and R3 represent hydrogen or a substituent and q represents an integer number of 2 or more, and
the concentration of the nitrogen compound is within the range: 4-fluoro-1,3-dioxolan-2-one (mol/kg)/number of unshared electron pairs in nitrogen compound× 0.4≤concentration of nitrogen compound (mol/kg) ≤concentration of 4-fluoro-1,3-dioxolan-2-one (mol/kg)/number of unshared electron pairs in nitrogen compound×10.

2. The battery according to claim 1, wherein the anode contains a carbon material.

3. The battery according to claim 1, wherein the cathode, the anode, and the electrolytic solution are contained in a film package member.

4. The battery according to claim 1, wherein the compound having proton scavenging capacity is hexamethylenetetramine.

5. The battery according to claim 1, wherein the compound having proton scavenging capacity is represented by Chemical formula 4:

$(C_mF_{2m+1}SO_2)(C_nF_{2n+1}SO_2)NLi$, where each of m and n represent a positive integer number.

6. The battery according to claim 1, wherein the compound having proton scavenging capacity is represented by Chemical formula 5.

7. The battery according to claim 1, wherein the compound having proton scavenging capacity is represented by Chemical formula 6.

8. The battery according to claim 1, wherein the cathode comprises a compound expressed by the general formulas $Li_zMIO_2$ or $Li_yMIIPO_4$ where MI and MII each represent at least one transition metal, $0.05 \leq x \leq 1.10$, and $0.05 \leq y \leq 1.10$.

* * * * *